United States Patent
Thakur et al.

(10) Patent No.: US 6,859,753 B1
(45) Date of Patent: Feb. 22, 2005

(54) APPARATUS AND METHOD FOR MEASURING THE WEIGHT OF AN OCCUPANT IN A VEHICLE

(75) Inventors: Rajeev Thakur, Lake Orion, MI (US); Chad Vanfleet, Northville, MI (US); Aleksandr Golshteyn, Southfield, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/649,849

(22) Filed: Aug. 26, 2003

(51) Int. Cl.[7] .......................... G06F 15/00; G01G 19/00
(52) U.S. Cl. ...................... 702/173; 702/41; 702/174; 180/273
(58) Field of Search ........................... 702/33, 41, 173, 702/174; 340/665, 666, 667; 180/272, 273; 177/144, 211

(56) References Cited

U.S. PATENT DOCUMENTS

| | | | |
|---|---|---|---|
| 3,354,710 A | 11/1967 | Johnson | |
| 3,835,946 A | 9/1974 | Mettler | |
| 3,997,014 A | 12/1976 | Soderholm et al. | |
| 4,297,875 A | 11/1981 | Kuhnle et al. | |
| 4,359,099 A | 11/1982 | Henslin | |
| 4,396,079 A | 8/1983 | Brendel | |
| 4,726,435 A | 2/1988 | Kitagawa et al. | |
| 4,799,562 A | 1/1989 | Burrows et al. | |
| 5,319,161 A | 6/1994 | Miller et al. | |
| 5,410,109 A | 4/1995 | Tarter et al. | |
| 5,564,784 A * | 10/1996 | Felling .................. | 297/344.23 |
| 5,864,295 A | 1/1999 | Jarocha | |
| 5,971,432 A | 10/1999 | Gagnon et al. | |
| 6,000,717 A | 12/1999 | Rayford | |
| 6,039,344 A | 3/2000 | Mehney et al. | |
| 6,069,325 A | 5/2000 | Aoki | |
| 6,087,598 A | 7/2000 | Munch | |
| 6,231,076 B1 | 5/2001 | Blakesley et al. | |
| 6,242,701 B1 | 6/2001 | Breed et al. | |
| 6,288,649 B1 | 9/2001 | Wolfe | |
| 6,318,208 B1 * | 11/2001 | Thongs et al. .................. | 74/513 |
| 6,323,444 B1 | 11/2001 | Aoki | |
| 6,342,683 B1 | 1/2002 | Aoki et al. | |
| 6,356,200 B1 | 3/2002 | Hamada et al. | |
| 6,401,855 B1 | 6/2002 | Wolfe | |
| 6,407,347 B1 | 6/2002 | Blakesley | |
| 6,412,357 B2 | 7/2002 | Billen | |
| 6,448,512 B1 | 9/2002 | Cooper | |
| 6,508,514 B2 | 1/2003 | Wolfe | |
| 6,520,023 B2 | 2/2003 | Kimura | |
| 6,637,763 B2 * | 10/2003 | Kuo .......................... | 280/209 |
| 2001/0037904 A1 | 11/2001 | Breed et al. | |
| 2002/0063630 A1 | 5/2002 | Curtis et al. | |
| 2002/0134590 A1 | 9/2002 | Wolfe et al. | |
| 2002/0154020 A1 | 10/2002 | Sumi et al. | |
| 2003/0070846 A1 | 4/2003 | Wolfe et al. | |

* cited by examiner

*Primary Examiner*—Bryan Bui
(74) *Attorney, Agent, or Firm*—Michael Best & Friedrich LLP

(57) ABSTRACT

An apparatus and method for supporting a load-bearing platform (e.g., a seat) and measuring the weight of a load (e.g., an occupant) on the platform. The apparatus can include a base or support, a lever coupled to the support, and a sensor. The lever can be pivotally coupled to the support to allow pivotal movement of the lever with respect to the support in response to weight applied to the platform. The sensor can detect the force transmitted by the lever to determine the weight of the load on the platform. Furthermore, the lever can isolate the vertical load on the platform due to the weight of the load from other extraneous, non-vertical forces on the platform.

59 Claims, 11 Drawing Sheets

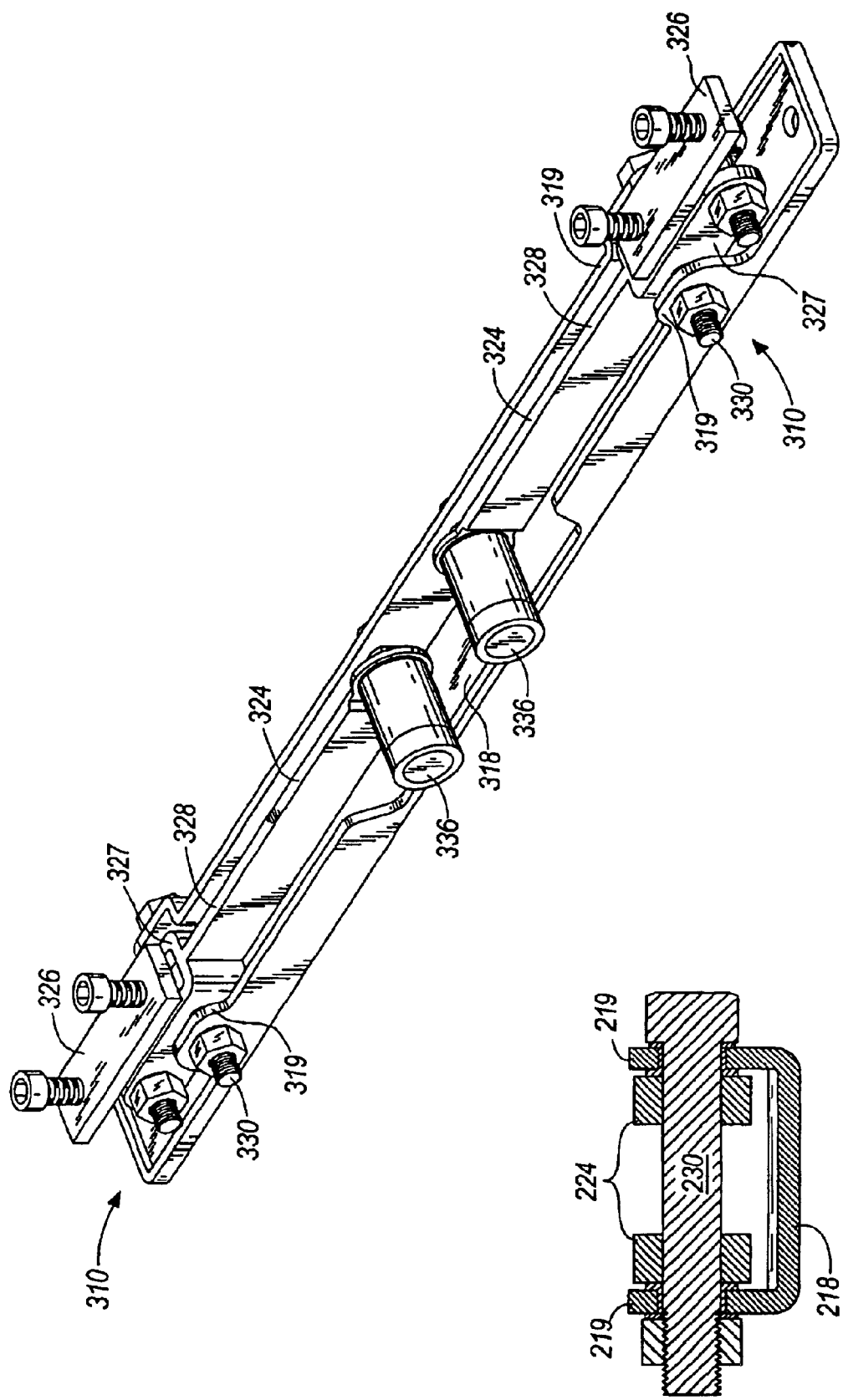

US 6,859,753 B1

APPARATUS AND METHOD FOR MEASURING THE WEIGHT OF AN OCCUPANT IN A VEHICLE

FIELD OF THE INVENTION

The present invention relates to an apparatus and method for measuring loads. Particularly, the invention relates to an apparatus and method for measuring a load on a load-bearing platform. More particularly, the invention relates to an apparatus and method for measuring the weight of an occupant sitting on a vehicle seat.

BACKGROUND

Automobiles are equipped with seat belts and airbags to provide safety for passengers. In recent years, there is a trend for controlling the operation of such safety devices according to the body weight of a passenger. For example, the amount of gas to be introduced into the airbag, an airbag inflating speed, or a pre-tension of the seat belt may be adjusted according to the weight of a passenger. To optimally use these safety devices, the weight of the seat's occupant must be measured.

Several devices have been designed to measure the weight of the occupant while seated. Most of these devices use some form of sensor to measure forces transmitted to it. Many of these devices, however, do not provide an accurate measure of the occupant's weight because additional forces other than the occupant's weight are also measured by the sensor. Specifically, the seat and any sensor coupled to the seat is subject to error-inducing loads caused by forces in the X, Y, and Z directions and moments about the X, Y, and Z directions. Examples of these error-inducing loads include horizontal forces caused by assembly forces or an occupant in the rear of the vehicle pushing on the seatback, twisting moments caused by a leaning occupant, non-vertical load components caused by the occupants weight during acceleration and deceleration of the vehicle, and the like. These error-inducing loads (or forces) can be transferred to the sensor and cause the sensor to generate incorrect information.

SUMMARY OF THE INVENTION

Some embodiments of the invention provide an apparatus for measuring a load on a load-bearing platform. For example, specific embodiments of the invention provide an apparatus or bracket for coupling a seat to a floor of a vehicle and measuring the weight of an occupant on the seat. Certain embodiments of the invention are particularly useful at preventing inaccurate readings of an occupant's weight due to extraneous forces placed on the seat and the bracket. In other words, the present invention can isolate the vertical load placed on a seat (which is due primarily to the weight of the occupant) from other extraneous, non-vertical forces placed on the seat by accelerations and decelerations of the vehicle and the like. As will be described in greater detail below, some embodiments use one or more pivots, levers, and sensors to filter out non-vertical loads from vertical loads.

The bracket according to some embodiments of the invention has a base connectable with the floor of the vehicle. The base has at least one support flange extending in a vertically oriented direction with respect to the floor of the vehicle. A pivot extends from at least one support flange of the base. A sensor is coupled to at least one support flange of the base. A lever is positioned adjacent to the base and has a bifurcated or forked portion and a second portion adjacent to the bifurcated portion. The lever is coupled to the pivot along the bifurcated portion and can be coupled to the sensor along the second portion. The lever is connectable with the seat along the bifurcated portion and pivotable about the pivot in response to forces applied to the seat. The sensor limits the relative movement of the lever about the pivot with respect to the base and is capable of detecting the relative movement of the lever with respect to the base to sense the weight of the occupant. The lever is configured to resist bending about an axis parallel to the pivot. In other words, the lever is configured to resist bending due to vertical forces applied to the lever.

The bracket according to other embodiments of the invention has a first lever positionable between the floor and seat and pivotable about a first axis substantially parallel to the floor and extending through the first and second sides of the seat. The first lever has a first portion having a bifurcated end and is positionable adjacent the first side of the seat. The first axis extends through the bifurcated end and the first portion is pivotable about the first axis. The first portion is configured to resist bending about a second axis parallel to the first axis. The first lever also has a second portion having a bifurcated end and is positionable adjacent the second side of the seat. The first axis extends through the bifurcated end and the second portion is pivotable about the first axis. The second portion is configured to resist bending about a third axis parallel to the first axis. The first lever also has a third portion connecting the first portion to the second portion. The third portion has a tab extending in a direction substantially perpendicular to the first axis.

The bracket also has a second lever positionable between the floor and seat and pivotable about a fourth axis substantially parallel to the floor and extending through the first and second sides of the seat. The second lever has a first portion having a bifurcated end and is positionable adjacent the first side of the seat. The fourth axis extends through the bifurcated end and the first portion is pivotable about the fourth axis. The first portion is configured to resist bending about a fifth axis parallel to the fourth axis. The second lever has a second portion having a bifurcated end and is positionable adjacent the second side of the seat. The fourth axis extends through the bifurcated end and the second portion is pivotable about the fourth axis. The second portion is configured to resist bending about a sixth axis parallel to the fourth axis. The second lever also has a third portion connecting the first portion to the second portion. The third portion has a tab extending in a direction substantially perpendicular to the first axis. The bracket also includes a sensor extending through the tab of each lever and connecting the first lever to the second lever. The sensor is capable of detecting movement of the levers due to weight on the seat and positioned to limit the relative movement of the levers with respect to the base.

In some embodiments of the invention, the bracket can include a first lever coupled to the floor. The first lever is pivotable about a first axis that is substantially parallel to the floor. The first lever is also connectable with the seat at a first end of the lever and pivotable about the first axis in response to forces applied to the seat. The second end of the first lever has an aperture. The first lever is also configured to resist bending about a second axis substantially parallel to the first axis. The bracket can also include a second lever coupled to the floor. The second lever is pivotable about a third axis that is substantially parallel to the floor and located a first distance from the first axis. The second lever is connectable with the seat at a first end of the second lever and pivotable about the third axis in response to forces applied to the seat. The second end of the second lever has an aperture and is configured to resist bending about a fourth axis substantially parallel to the third axis. A sensor is coupled to the floor and located a second distance from the first pivot, the second distance less than the first distance. The sensor extends through the aperture of the first lever and the aperture of the second lever, and limits the relative movement of the lever with respect to the base. The sensor is capable of detecting the relative movement of the lever with respect to the base due to forces on the seat.

Additionally, in other embodiments of the invention, a method of sensing and isolating a vertical load due to weight applied to a seat is disclosed. The method can include the following steps: applying a load to the seat, the load having a vertical force component and a horizontal force component; transferring the load from the seat to a structure supporting the seat, the structure having a base coupled to a floor, a first lever coupled to the base at a first pivot, and a second lever coupled to the base at a second pivot, a portion of the second lever overlapping and coupled to the first lever, and a sensor coupled to the first and second lever at the overlapping portion; pivoting the first and second lever with respect to the base due to the vertical force component of the load transferred to the supporting structure; isolating the horizontal force component at the first and second pivot; preventing the horizontal force component from acting on the sensor by isolating it at the first and second pivot; summing the vertical load applied to the first lever and the vertical load applied to the second lever at the sensor; and sensing the weight applied to the seat by measuring the summed vertical load.

Also, other embodiments of the invention disclose a bracket having a base, a sensor, a pivot, and a U-shaped lever. The base is connectable with the floor of the vehicle, and it has at least three connecting locations defined as a first, second, and third connection location. The pivot extends between the first connecting location and the second connecting location on the base. The sensor is coupled to the third connecting location. The U-shaped lever extends at least partially around a perimeter of the base defined by the three connecting locations. The lever has a first and second portion defining the sides of the U-shaped lever and a third portion connecting the first and second portions. The pivot intersects the first portion and the second portion to couple the lever to the base. The sensor is coupled to the lever to restrict the relative movement of the lever with respect to the base and is capable of detecting the relative movement of the lever with respect to the base to sense the weight of the occupant.

Yet other embodiments forces can be isolated with an apparatus having a base connectable with a floor of a vehicle and having at lease one support extending in a vertically oriented direction with respect to the floor of the vehicle. A first pivot having a first axis extends perpendicularly from the at least one support of the base and a lever that is pivotable about the first axis is positioned adjacent to the base and is coupled to the first pivot. A linkage is adapted to connect a seat to the lever. The linkage is coupled to the lever and is pivotable about at least a second axis, where the second axis is substantially perpendicular to the first axis. A sensor is coupled to the at least one support of the base and the lever.

Further aspects of the present invention, together with the organization and operation thereof, will become apparent from the following detailed description of the invention when taken in conjunction with the accompanying drawings.

BRIEF DESCRIPTION OF THE DRAWINGS

The present invention is further described with reference to the accompanying drawings. However, the drawings illustrate certain embodiments and examples only. The various elements and combinations of elements described below and illustrated in the drawings can be arranged and organized differently to result in embodiments which are still within the spirit and scope of the present invention.

In the drawings, wherein like reference numeral indicate like parts:

FIG. 8B is a cross-section of the embodiment illustrated in FIG. 8A taken along line 8B—8B;

FIG. 9 is a perspective view of a fourth embodiment of the present invention;

DETAILED DESCRIPTION OF THE ILLUSTRATED EMBODIMENTS

Several embodiments of the present invention will be described below. Some features of each embodiment are similar and are therefore given similar reference numbers. For example, a feature labeled as element "9" in one embodiment, may be labeled as element "109," "209," etc. in other embodiments. Although some features may share a common number, it does not mean that the features are identical. Rather, it indicates that these features are similarly situated, share structural similarities, or perform similar functions. The features that are common to one or more embodiments will generally only be described once. Thus, it will be described in the first embodiment in which it appears. The descriptions of common elements will generally not be repeated in subsequent embodiments. Thus, reference to previous embodiments may be required in some instances to fully understand certain embodiments.

Figure 1:
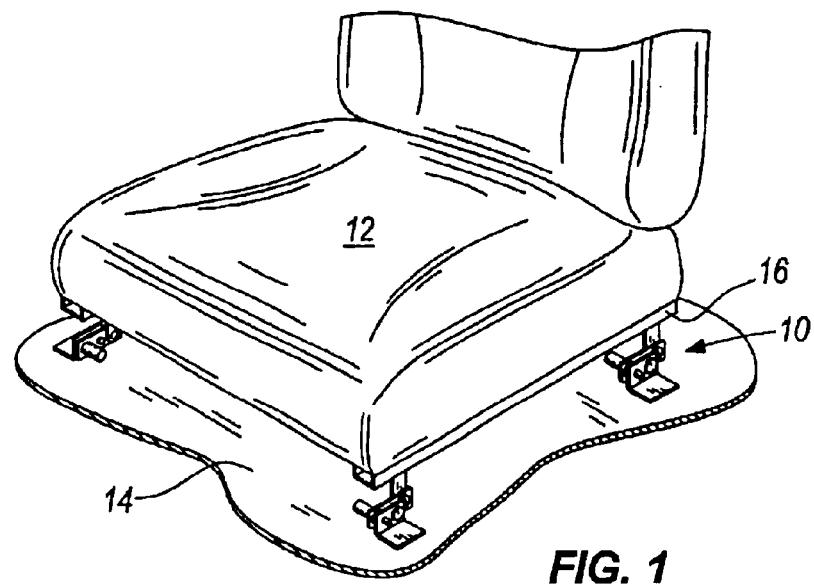
FIG. 1 is a perspective view of a seat coupled to the floor of a vehicle via four brackets representing one embodiment of the present invention.

FIG. 1 illustrates a plurality of brackets 10 positioned below a seat 12 to support and connect the seat 12 to a floor 14 of a vehicle (not shown). For example, in some embodiments, one bracket 10 can be placed under each corner of the seat 12 as illustrated. However, in other embodiments, less brackets can be used. Additionally, the bracket(s) 10 can be connected directly to the seat 12 or indirectly through structures such as rails 16, to allow the position of the seat relative to other parts of the vehicle (in an x-direction) to be adjusted in a manner well known in the art. Finally, although the illustrated brackets 10 are all oriented in the same direction, in some embodiments, the brackets 10 can be oriented different from one another. For example, the front and rear brackets 10 can mirror images of each other as illustrated in some embodiments.

Figure 2:
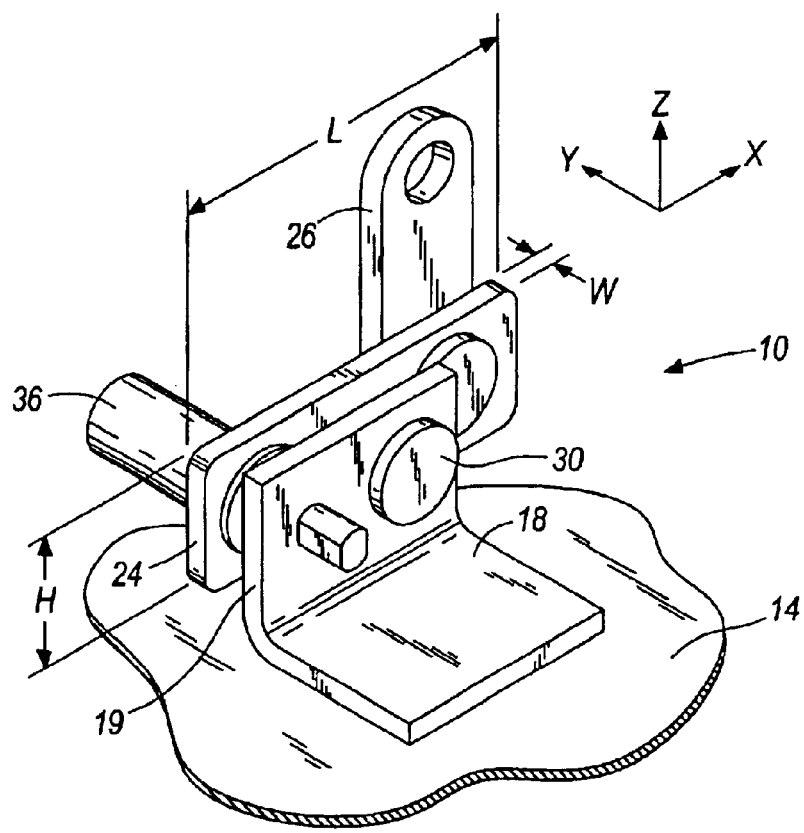
FIG. 2 is a perspective view of one embodiment of the present invention.

One specific embodiment of the bracket 10 is illustrated in FIG. 2. As illustrated, this embodiment of the bracket 10 has a support or base 18 that couples the bracket 10 to the floor 14 of the vehicle, a lever 24 coupled to the support 18 via a pivot 30, and a sensor 36 coupled to both the lever 24 and the support 18. As will be discussed in greater detail below, the sensor 36 is able to detect the weight of the occupant based upon the forces placed on the sensor 36 due to the relative movement between the lever 24 and the support 18.

As indicated above, the support 18 anchors or connects the seat 12 and the remainder of the bracket 10 to the floor 14 of the vehicle. The support 18 can be coupled to the floor 14 of the vehicle by one or more fasteners, such as bolts, rivets, other interlocking engagements, welds, adhesive/cohesive bonds, and the like. The support 18 also has a portion or flange 19 that extends up from the floor to support the lever 24 above the floor 14. As shown in FIG. 2, the lever 24 is coupled to the flange 19 of the support 18 via the pivot 30 that extends from the flange 19. The lever 24 is pivotable about the pivot 30 to transmit forces to the sensor 36.

As discussed above, the lever 24 can be coupled to the seat directly or indirectly through other components. For example, as illustrated in FIGS. 1 and 2, the seat 12 can be coupled to an adjustment rail 16 in a conventional manner and the rail 16 can be coupled to the lever 24 directly or via other structures such as the linkage 26 illustrated. The lever 24 is coupled to the seat 12 at a position located a first distance from the pivot 30 and coupled to a sensor 36 at a position located a second distance from the pivot 30. Note that the terms first and second are used to indicate that two distinct measurements are made. The terms are not intended to indicate that one distance is greater than another. In addition, it should be noted that the first and second distances can have equal values. For example, in some embodiments, such as the one illustrated in FIG. 2, the seat 12 is coupled to the lever 24 on one side of the pivot 30 and the sensor 36 is coupled to the lever 24 at an equal distance on the other side of the pivot 30. As illustrated, the first and second distances can be about the same. However, in other embodiments, the first and second distances can have different values depending on the force attenuation or amplification desired. Additionally, in some embodiments, the sensor 36 and the seat 12 can be coupled to the same side of the lever 24 with respect to the pivot 30, but at different distances from the pivot 30.

The lever 24 (or a bushing/bearing surface of the lever) preferably has a relatively close tolerance fit with the pivot 30 to prevent the lever 24 from wobbling or moving about the pivot 30 in any manner other than pivoting about the axis of the pivot 30. As will be discussed below, by restricting the degrees of freedom of the lever 24, the forces transmitted to the sensor more accurately represent the weight of the occupant.

Even though the lever's degrees of freedom can be limited to increase the accuracy of the weight detected by the sensor 36, other factors can still contribute to false readings. For example, if the lever 24 were to substantially bend or flex about an axis parallel to the axis of the pivot 30, the weight sensed by the sensor 36 would be less accurate than if the lever 24 did not flex. When the lever 24 flexes, non-vertical load components are generated, which can give an incorrect reading of the occupant's weight. Thus, some embodiments of the present invention have a lever 24 that is configured to resist bending due to the force placed on the lever by the occupant's weight. In other words, the lever 24 can resist bending about an axis parallel to the axis of the pivot 30.

The term "resist bending" indicates that the lever has a stiffness associated with it such that the lever will tend not to bend or to bend in such a small degree that it does not substantially alter the measurements being made. It is understood that all structures have a limited amount of bending or deflection under even the smallest loads. However, this bending is typically so small that it is not measurable in most situations and does not interfere with the operation of the structure. In certain embodiments, for example, the lever has a stiffness that resists bending by deflecting no more than about 0.15 mm when a 100 kg load is placed on the lever.

The displacement of the lever relative to the sensor due to bending forces is generally dependent upon the length of the lever and the stiffness of the lever at its point of support. In some embodiments, the amount of deflection or displacement (y) due to bending forces can be predicted by the following formula:

$$y=(F*L^3)/(3*E*I)$$

where y=the displacement of the lever, F=the force applied, E=Young's modulus, and I=cross-sectional moment of inertia (which is $(b*h^3)/12$ for a rectangular cross-section, where b=base and h=height).

Examples of deflections for some embodiments will now be briefly discussed. A first example is provided for a lever having about a one-to-one ratio between the length of a first lever arm measured from the point of application of a load to the pivot and the length of a second lever arm measured from the pivot to the sensor. Assuming the lever is 95 mm long, has rectangular cross-section with a height of 35 mm and a base of 5 mm, is made of steel (E=200000 N/mm$^2$), and subject to a 1000 N force, the maximum deflection of the lever would be about 0.08 mm.

A second example is provided for a lever having about a one-to-two ratio between lever arms. Assuming the lever is 130 mm long, has a rectangular cross-section with a height of 35 mm and a base of 5 mm, is made of steel (E=200000 N/mm$^2$), and subject to a 500 N force, the maximum deflection of the lever would be about 0.1 mm.

A third example is provided for a lever having about a one-to-three ratio between lever arms. Assuming the lever is 143 mm long, has a rectangular cross-section with a height of 35 mm and a base of 5 mm, is made of steel (E=200000

N/mm$^2$), and subject to a 333.3 N force, the maximum deflection of the lever would be about 0.09 mm.

As suggested in the above examples and as illustrated in FIG. 2, one manner in which the lever can resist bending is by having a height H that is greater than the width W. This configuration, however, is not the only configuration that resists bending. Rather, other configurations are well known in the art to prevent bending. For example, the lever 24 could have various cross-sectional shapes such as circular, square, triangular, and the like, or the lever could be strengthened with different types of materials, ribs, and support structures.

As discussed above, extraneous forces from things such as vehicle accelerations can be detected by some conventional sensors, which in turn causes an inaccurate measure of the occupant's weight. Embodiments of the present invention, however, tend to isolate these extraneous forces from the vertical loads placed on the seat primarily due to the weight of the occupant. As shown in FIG. 2, the illustrated bracket 10 is subject to a variety of forces and each force is the result of a series of component forces directed in the x, y, and z direction. The vertical or z-direction force $F_z$ illustrated is primarily due to the weight of an occupant on the seat (not illustrated), while the extraneous forces have component forces that act primarily in the x-direction and y-direction with corresponding horizontal forces $F_x$ and $F_y$. The lever 24 allows only the z-direction forces to be transmitted to the sensor because only the vertical components (i.e., the z-direction component) of forces acting on the illustrated lever will cause rotation about the pivot 30. The other components of forces (i.e., x-direction and y-direction) will not cause rotation of the lever about the pivot, but rather will be resisted by the pivot 30 and support 18. Therefore, these components of the extraneous forces will not be detected by the sensor 36. Since most extraneous forces are directed primarily in the x-direction and the y-direction and the occupant's weight is directed in the z-direction, the majority of the force detected by the sensor 36 is due to the weight of the occupant.

Figure 3:
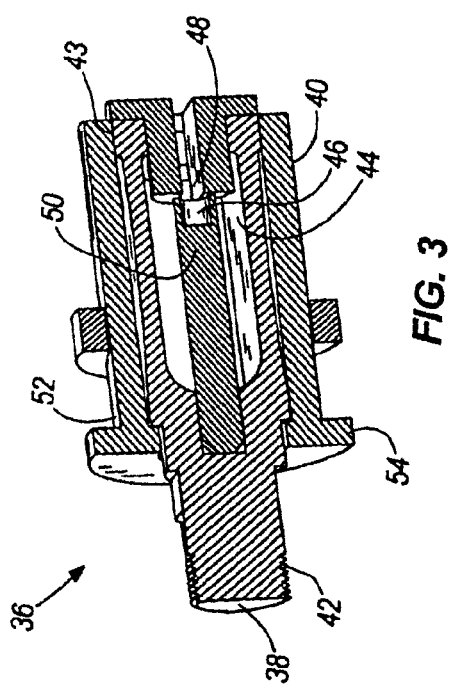
FIG. 3 is a perspective cross-sectional view of one embodiment of a sensor that is adapted for use with embodiments of the present invention.

One particular embodiment of a sensor 36 is illustrated in FIG. 3. Although only one specific embodiment of a sensor is illustrated, it is not the only sensor capable of working with the present embodiment. Rather, other sensors could be adapted to be used with embodiments of the present invention. For example, strain gauges, load cells, optical sensors, torsional sensors, and the like could be used in alternative embodiments. Additionally, eddy-current, piezoelectric, or any other transducer technology can be used as the sensor.

The illustrated sensor 36 includes a bolt 38 and a cup or sleeve 40 that surrounds the bolt. The bolt 38 includes a threaded shaft 42, which is coupled to the seat support 18 with a nut or other fastener (not shown). The body of the bolt 38 has an elongated opening or chamber 44 that houses a magnet 46 and a Hall-effect sensor 48 that operates to detect a change in the magnetic field. The magnet 46 is positioned at a first end of an elongated magnet holder 50 and the opposite end of the magnet holder 50 (i.e., the end without the magnet 46) is coupled to a first end of the chamber 44 as illustrated. Thus, the magnet holder 50 and magnet 46 are cantilevered within the chamber 44. The Hall-effect sensor 48 is coupled to a second end of the chamber opposite the magnet holder 50. A space is preserved between the Hall-effect sensor 48 and the magnet 46. Although it is not illustrated, a processing circuit is connected to the Hall-effect sensor 48.

The cup 40 is connected or integral with a second end 43 of the bolt 38 and surrounds the end of the bolt 38 containing the chamber 44. The cup 40 extends from the second end 43 of the bolt 38 in a cantilevered manner. The cup 40 includes a flange 54 and a shoulder 52 such that the lever 24 of the seat bracket 10 rests upon the shoulder 52 adjacent the flange 54. The lever can be secured to the flange 54 via a conventional faster such as a nut, set screw, retaining ring, sleeve, weld, adhesive, and the like. The interface between the lever and the sensor does not need to be rigid. Rather, sliding contact between the two can be allowed, such as with an elongated aperture.

As a force is applied to the vehicle seat 12, the force is transmitted from the seat 12 to the lever 24 and through the cup 40 and the bolt 38 to the support 18. The force on the lever 24 causes the cantilevered portion of the cup 40 to move with respect to the bolt 38. As the cup 40 moves with respect to the bolt 38, the magnetic field inside the chamber 44 changes. The relative movement of the cup 40 with respect to the bolt 38 and interruption of the magnetic field produces a magnetic change that is detected by the Hall-effect sensor 48. The detection of the magnetic change by the sensor 48 produces electrical signals that are sent to the processing circuit. The electrical signals are processed (and added together if multiple sensors are used) to produce a measurement of the force or weight applied to the vehicle seat 12. The measurement of the force applied to the vehicle seat 12 is representative of the amount of movement of the cup 40.

Due to the design of this sensor 36, the bracket 10 does not need a separate device to limit the relative movement between the support 18 and the lever 24 to prevent sensor overload, like some conventional brackets. Rather, although the cup-and-bolt design allows some relative movement between the support 18 and the lever 24, the cantilevered end of the cup 40 will contact the bolt 38 under excessive forces to limit the relative movement between the support 18 and the lever 24. In some embodiments, the relative movement between the cup 40 and the bolt 38 is limited to 0.5 mm., which may occur at loads over 981 N.

A second embodiment of the invention is illustrated in FIGS. 4–7. As illustrated in these figures, this embodiment has many similar features to the first embodiment. Therefore, only the main differences between the two embodiments will be discussed in detail.

Like the previous embodiment, the bracket 110 of this embodiment has a support 118, a lever 124 coupled to the support 118 via a pivot 130 and a sensor 136 coupled to the support 118 and the lever 124. The support 118 of this embodiment is slightly different than the previous embodiment. While the previous embodiment had only one portion or flange 19 that extended upward from the floor of the vehicle to support the pivot 30, the present embodiment has two flanges 119 that extend up from the floor of the vehicle to support the pivot 130. As illustrated, the pivot 130 extends from the first flange 119 to the second flange 119 and then through the lever 124. This arrangement can provide greater stability for the pivot 130 to help limit the degrees of freedom for the lever 124.

Figure 4:
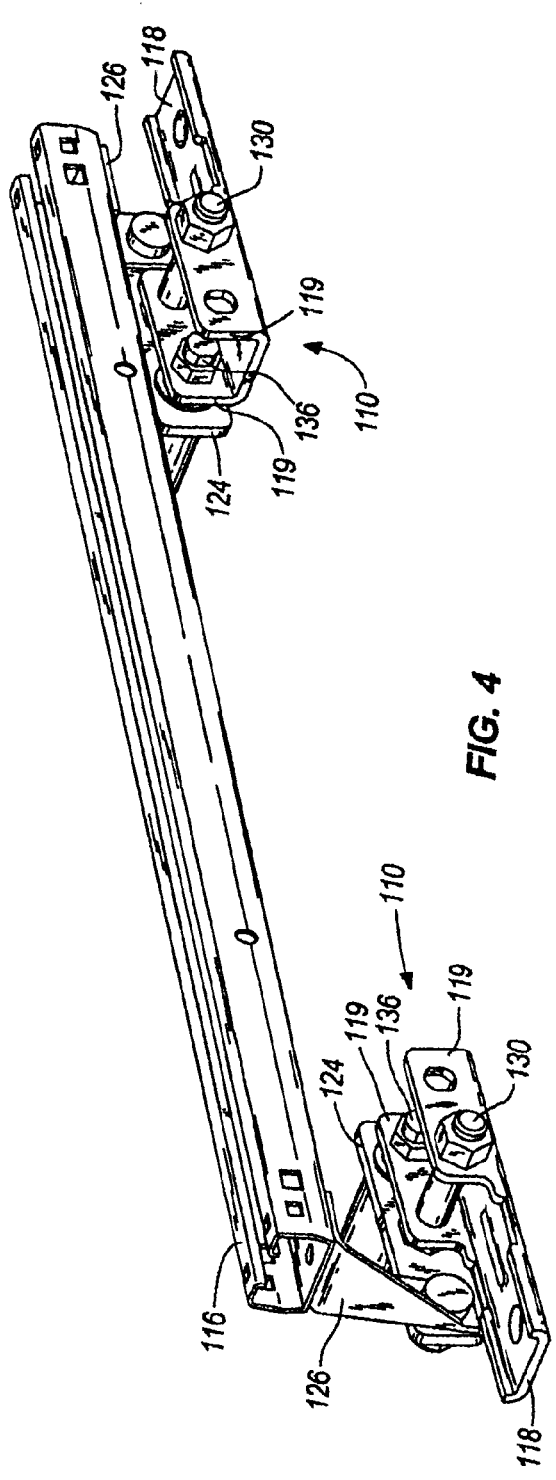
FIG. 4 is a perspective view of a second embodiment of the present invention, shown attached to a seat rail.
Figure 5:
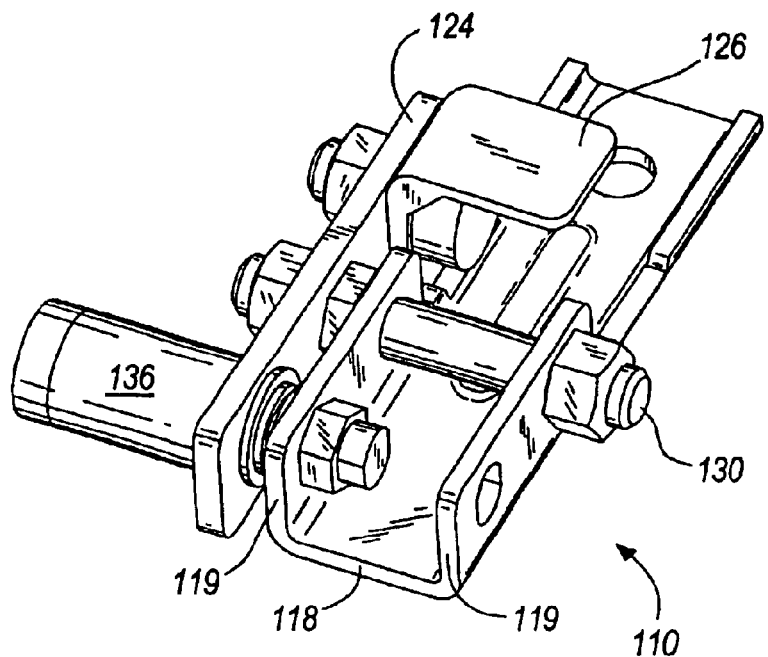
FIG. 5 is a perspective view of one of the brackets illustrated in FIG. 4.
Figure 6:
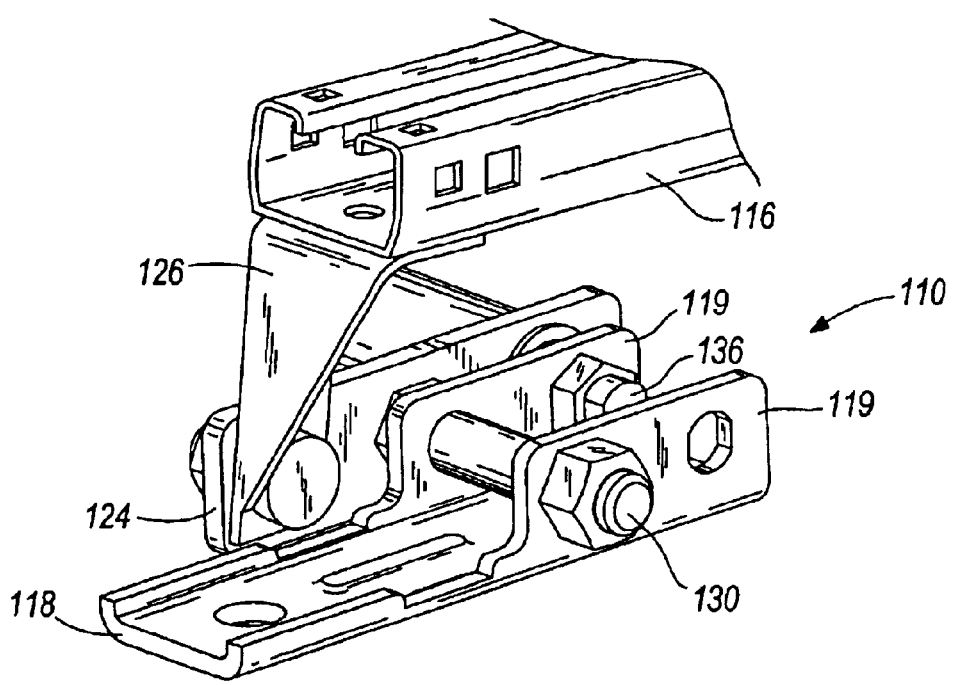
FIG. 6 is a perspective view of the other bracket illustrated in FIG. 4.
Figure 7:
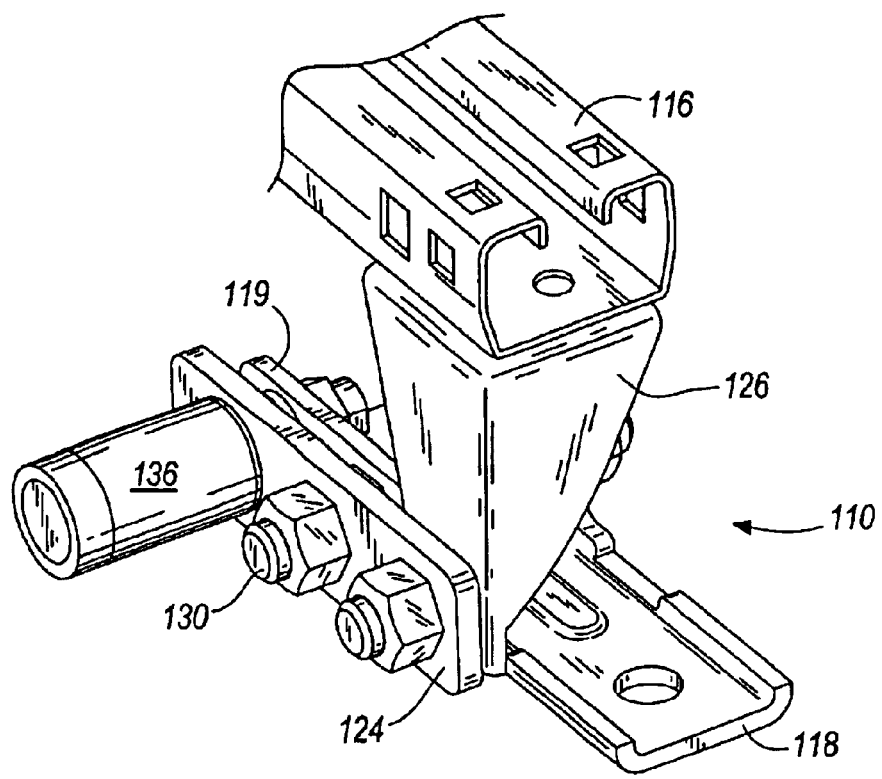
FIG. 7 is another perspective view of the bracket illustrated in FIG. 6.

Another difference between these two embodiments is found with the linkage 126 that extends between the lever 124 and the seat rails 116 (or seat). In the embodiment illustrated in FIG. 2, the linkage 26 is straight and connects to the side of the rail 16 or seat. In the embodiment illustrated in FIGS. 4–7, the linkage 126 is bent and has a plateau that connects to the bottom of the rail 116. Furthermore, as illustrated in FIGS. 4, 5, and 6, the length of the linkage 126 can vary depending upon the location of the bracket 110. For example, in some vehicles the front linkages 126 need to be longer than the rear linkages 126 (or vice versa) to properly position the seat.

Figure 8A:
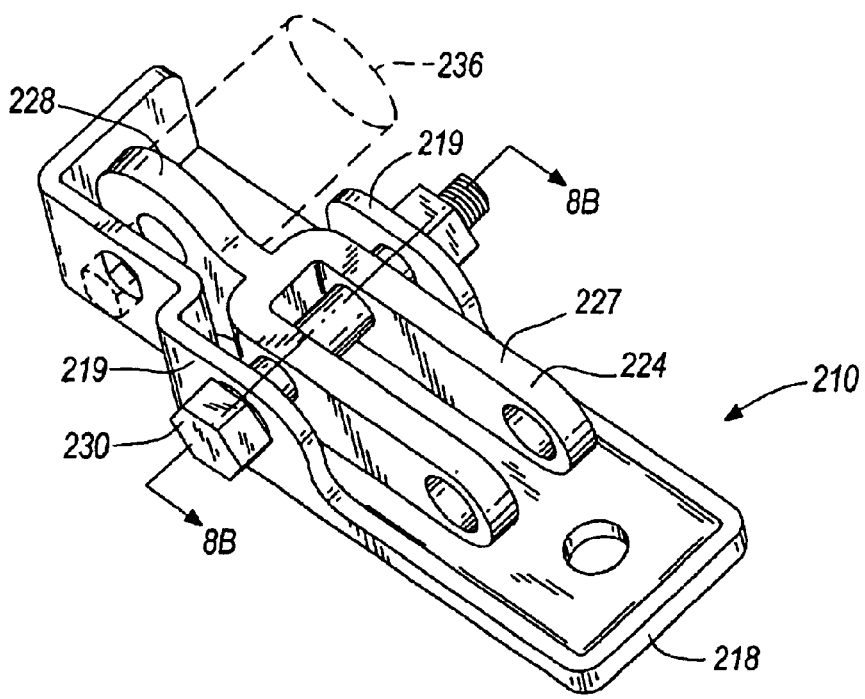
FIG. 8A is a perspective view of a third embodiment of the present invention.

A third embodiment of the invention is illustrated in FIGS. 8A and 8B. This embodiment operates on similar principles as the previous embodiments. Therefore, only the main differences between the third embodiment and the first and second embodiments will be discussed in detail.

Like the previous embodiments, the bracket 210 of the third embodiment has a support 218, a lever 224 coupled to the support 218 via a pivot 230, and a sensor 236 coupled to the support 218 and the lever 224. Furthermore, the support 218 of this embodiment has two flanges 219 for supporting the pivot 230, like the second embodiment. However, unlike that embodiment, the lever 224 is located between the two flanges 219 rather than on one side of both flanges.

Additionally, the lever 224 is split into two portions: a first portion 227 that is bifurcated or forked and a second portion adjacent the first portion 228. As best illustrated in FIG. 8B, the pivot 230 extends through the bifurcated portion 228. This can provide greater stability to the lever 224, which may help to limit the lever's degrees of freedom and increase the accuracy of the sensor 236. The seat can be coupled to the bifurcated portion 227 and the sensor 236 is coupled to the second portion 228. It should be understood, however, that in alternative embodiments, these portions can be reversed or extended. For example, the seat can be coupled to the second portion 228 while the sensor 236 can be coupled to the bifurcated portion 227. Also, the entire lever 24 can be bifurcated. These and other modifications are well understood by those having ordinary skill in the art and fall with in the spirit and scope of the present invention.

A fourth embodiment of the invention is illustrated in FIG. 9. This embodiment is substantially similar to the third embodiment, except for the following differences. First, the fourth embodiment has a support 318 that is substantially longer than the support in the previous embodiments, and the support 318 is coupled to two levers 324 and sensors 336. Thus, the support 318 of this embodiment is used to couple together two brackets 310. The second difference between the two embodiments is that the second portion 328 of each lever 324 is substantially longer than the previous embodiment. As illustrated in the previous embodiment, the ratio of the lever arm between sensor 236 and the pivot 230 to the lever arm between the seat connection and the pivot 230 was nearly one because both lever arms were about the same length. In the present embodiment, the ratio is substantially greater than one because the lever arm between the sensor 336 and the pivot 330 is much longer in this embodiment. By adjusting the lever arm ratio, a desired force amplification or attenuation can be produced.

Figure 10A:
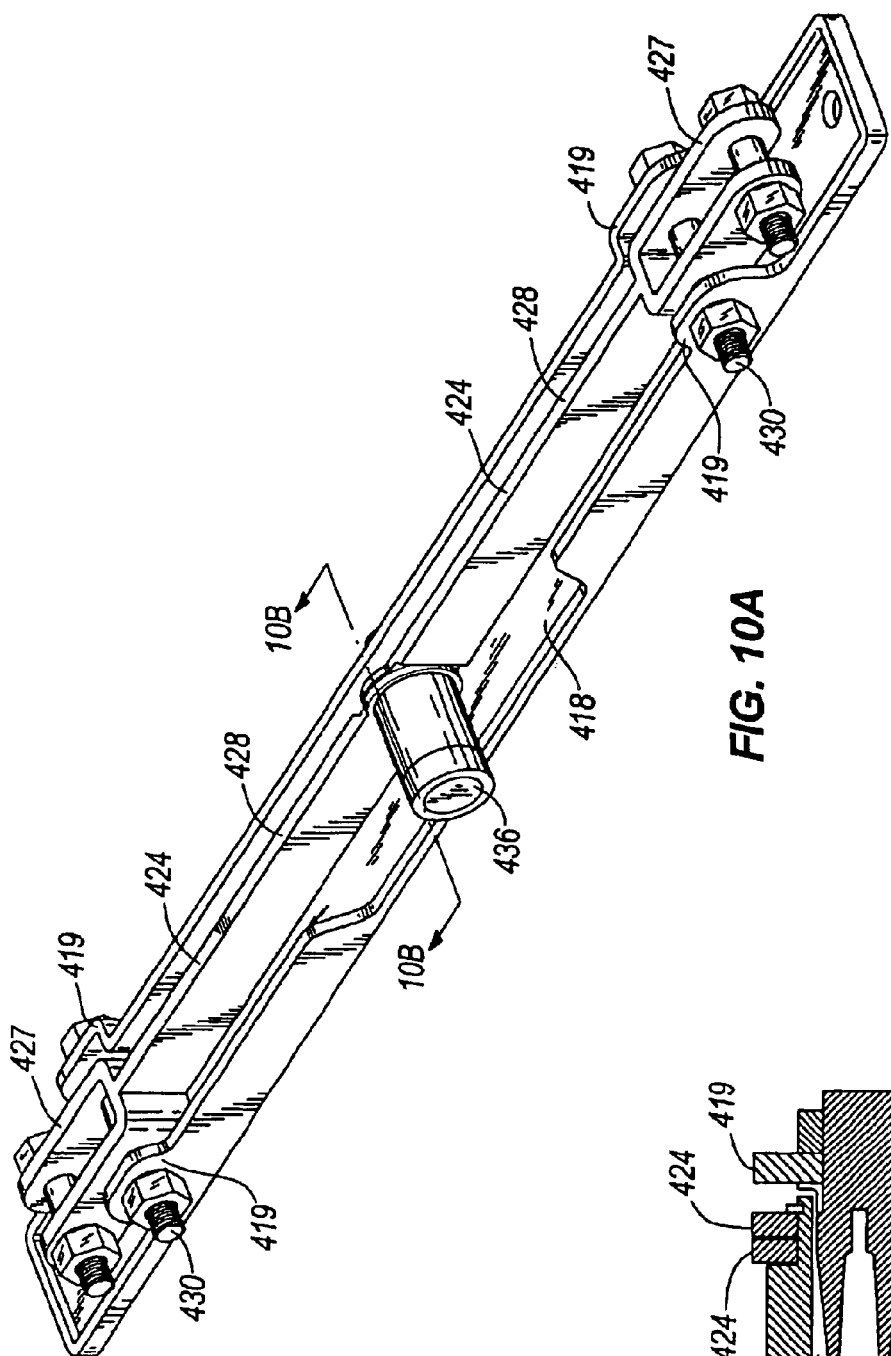
FIG. 10A is a perspective view of a fifth embodiment of the present invention.
Figure 10B:
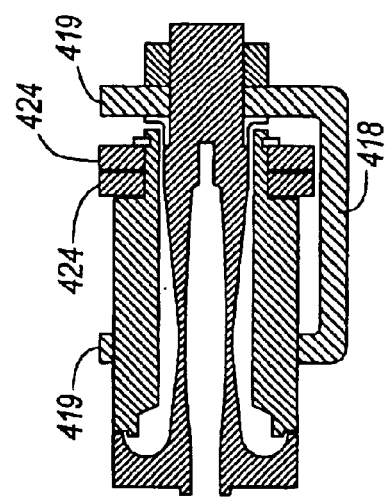
FIG. 10B is a cross-section of the embodiment illustrated in FIG. 10A taken along line 10B—10B.

FIGS. 10A and 10B illustrates a fifth embodiment of the invention. As shown in the illustration, this embodiment is quite similar to the fourth embodiment. Therefore, only the main differences between the fifth and fourth embodiments will be explained in detail. The fifth embodiment allows less sensors to be used relative to the previous embodiments by using only one sensor 436 for every two levers 424. In other words, the ends of two levers 424 are coupled to the same sensor 436 as illustrated in FIG. 10B. Specifically, the levers 424 overlap each other and an aperture in each lever 424 (used to receive the sensor) is aligned with an aperture in an adjacent lever 424 to receive one sensor 436. Each lever 424 couples to the sensor 436 and the sensor 436 is also coupled to the support in substantially the same manner as the previous embodiments. The two levers 424 mechanically sum the forces received by each lever 424 as they act on the single sensor 436.

Figures 11, 11A, 12:
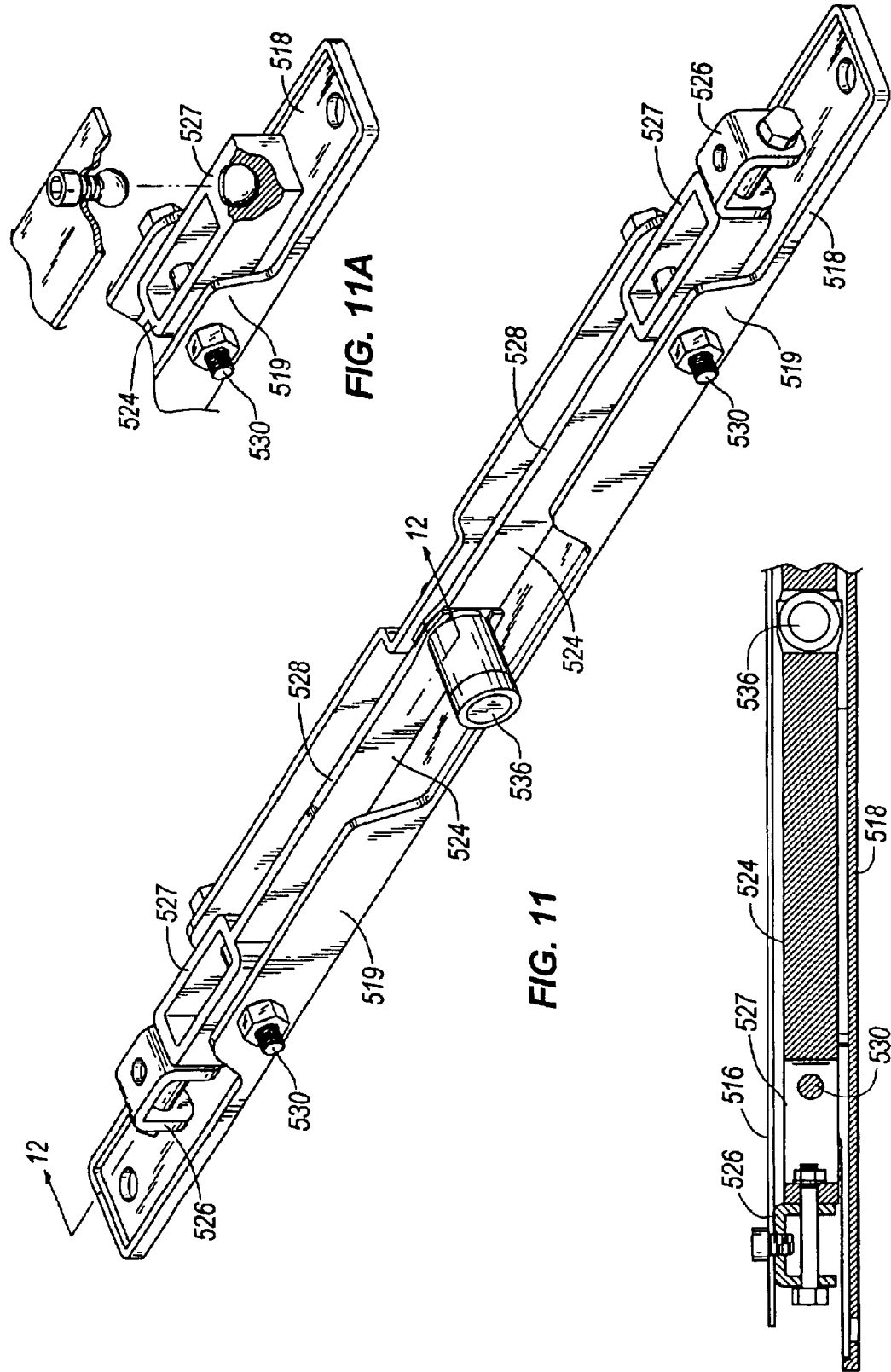
FIG. 11 is a perspective view of a sixth embodiment of the present invention.
FIG. 11A is a partial perspective view of the embodiment illustrated in FIG. 11 with a different connection between the seat and lever illustrated.
FIG. 12 is a partial cross-section of the embodiment shown in FIG. 11 taken along line 12—12.

FIGS. 11 and 12 illustrate a sixth embodiment of the invention. The sixth embodiment is an alternative embodiment of the fifth embodiment illustrated in FIGS. 10A and 10B. The sixth embodiment is similar to the fifth embodiment, except for the connection between the linkage 526 and the lever 524. The bifurcated portion 427 of the lever 424 has an open end. In other words, material connects only one end of the two branches of the bifurcated portion 427. At the other end, the two branches are free. In contrast to the fifth embodiment, the sixth embodiment has a lever 524, wherein the bifurcated portion 527 is closed at both ends. In other words, material connects the two branches of the bifurcated portion 527 at each end.

By closing off the bifurcated portion 527 at both ends, the linkage 526 can be connected in a different manner with the sixth embodiment. As illustrated in FIG. 12, the linkage 527 is connected to the closed end of the bifurcated portion 527 with a fastener. Unlike the previous embodiment, the illustrated fastener of this embodiment has an axis that is substantially normal to the axis of the pivot 530. Such an arrangement can help reduce y-direction forces and moments about the x-axis (see FIG. 2) transferred to the lever 524. Consequently, this reduces the number of extraneous forces that need to be filtered by the remainder of the apparatus. This arrangement between the lever and the linkage can be utilized in other embodiments disclosed herein.

Although a pivot having a single axis is illustrated in the sixth embodiment, other connections between the linkage 526 and the lever 524 can be utilized. For example, a ball joint can be used in place of the pivot. A ball joint can prevent moments from being transferred from the seat to the lever. Thus, in theory only forces will be transferred to the pivot 530. Specifically, this type of connection can reduce erroneous readings of the occupant's weight by eliminating or substantially reducing moments about the y-axis caused by x-direction forces that do not pass through the pivot 530. Since this type of connection reduces the number of error-inducing or extraneous forces and moments that are transferred to the lever 524, the pivot 530 does not have to filter as many forces. In some embodiments, such as the one illustrated in FIG. 11A, the ball joint can extend from the top surface of the lever 524 opposed to the end of the lever 524. For example, the ball portion of the ball joint can be received between the two branches of the bifurcated portion and the linkage connecting portion of the ball joint can extend upward to engage the linkage.

Figure 13:
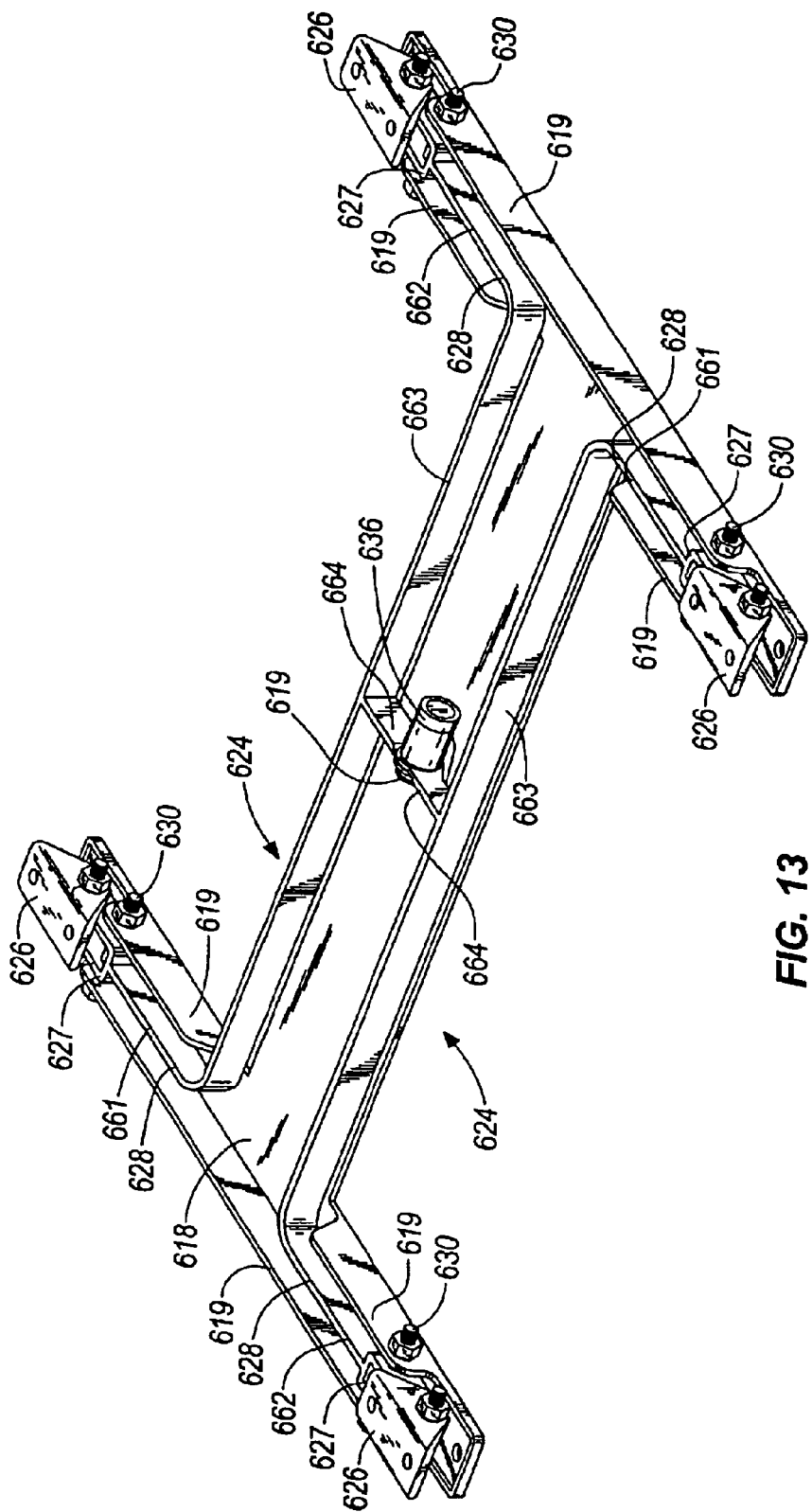
FIG. 13 is a perspective view of a seventh embodiment of the present invention.
Figure 14:
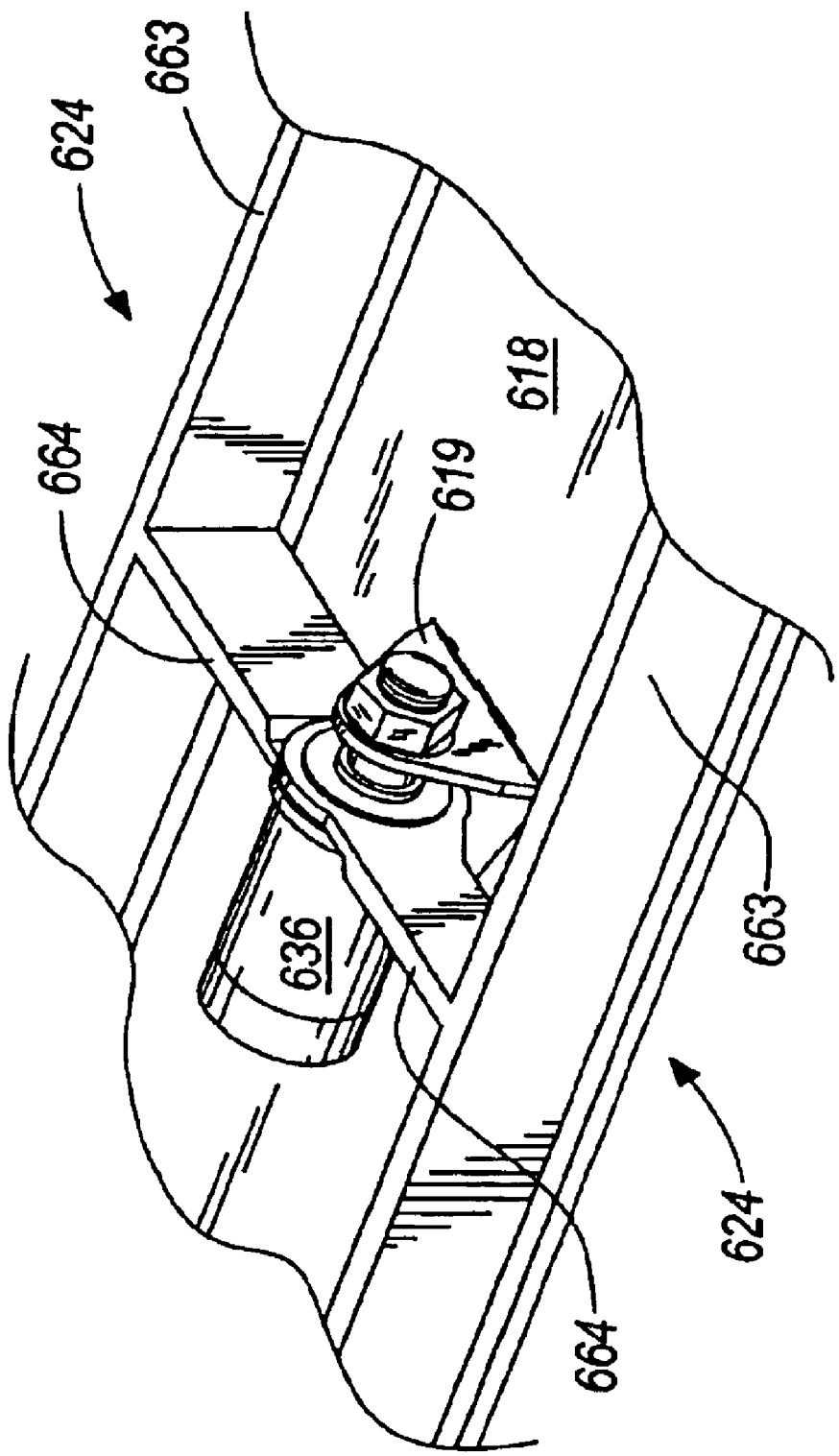
FIG. 14 is a partial perspective view of a portion of the embodiment illustrated in FIG. 13.

FIGS. 13 and 14 illustrate a seventh embodiment of the invention. Although this embodiment looks different from the previous embodiment, it operates in a similar manner. As illustrated, the seventh embodiment utilizes only one sensor 636 for each seat, while the fifth and sixth embodiments utilized two sensors 436, 536 for each seat. Consequently, the seventh embodiment mechanically sums the force from each corner of the seat at a single sensor 636 rather than summing the forces for two corners at one sensor 636. Specifically, this embodiment utilizes two relatively large levers 624 to interact with the sensor 636.

Each lever 624 is substantially identical and has a three portions: a first portion 661 located near a first corner of the seat, a second portion 662 located near a second corner of the seat, and a third portion 663 connecting the two portions 661, 662 together. The first and second portions 661, 662 are substantially identical. Therefore, only one will be discussed. The first portion 661 is substantially similar to the lever 324 of the fourth embodiment. Specifically, the first portion is split between a first segment 627 that is bifurcated and a second segment 628 adjacent the bifurcated portion. Like the previous embodiments, the pivot 630 and the seat are coupled to the first portion 661 along the bifurcated segment 627. However, unlike the previous embodiments, the third portion 663 of the lever 624 stretches underneath the seat from the first portion 661 located adjacent one side of the seat to the second portion 662 located adjacent an opposite side of the seat. Additionally, a tab 664 extends from the third portion 663 in a direction substantially perpendicular to the axis of the pivots 630. The tab 664 has an aperture for receiving the sensor 636. As assembled, the tab 664 from each lever 624 overlap each other and the apertures are substantially aligned to receive the sensor 636.

As illustrated in FIGS. 13 and 14, the support 618 for the seventh embodiment is substantially larger than the previous embodiments. The support 618 has several flanges 619 extending from the floor to receive the pivots 630 and a flange 619 extending up from the floor adjacent the tab 664 of each lever 624 to receive the sensor 636. As shown in FIG. 14, the cup 640 of the sensor 636 is coupled to the tabs 664 and the bolt 638 of the sensor 636 is coupled to the flange 619 extending from the support 618, much like the previous embodiment. The forces placed on each corner of a single lever 624 are mechanically summed by the lever 624 and passed to the sensor 636 via the tab 664. The forces passed to the tab 664 of each lever 624 are mechanically summed at the sensor 624 as they act on the sensor 636.

Figure 15:
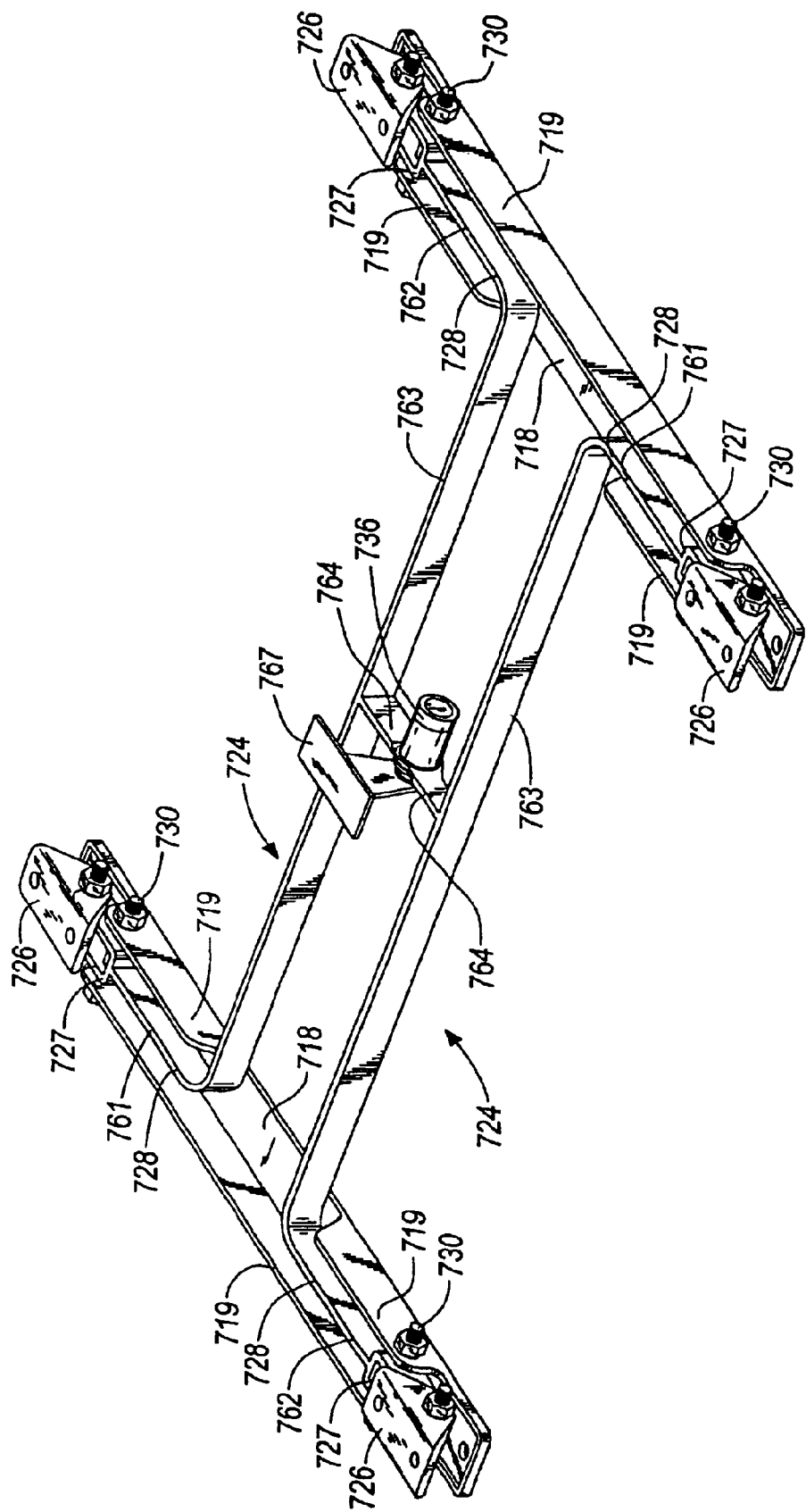
FIG. 15 is a perspective view of an eighth embodiment of the present invention.

The eighth embodiment of the invention is illustrated in FIG. 15. As shown, the eighth embodiment is an alternative embodiment of the seventh embodiment illustrated in FIGS. 13 and 14. As illustrated, the support 718 of the eighth embodiment is not as large as the support 618 of the seventh embodiment. Specifically, the support 718 does not stretch below the third portion 763 of each lever 724. As such, there is no flange extending from the support 718 adjacent the tabs 764 to connect to the sensor 736. Rather, the eighth embodiment has a linkage 767 that couples to the bolt 738 of the sensor 736 and extends upward toward the bottom of the seat. The linkage 767 can be fixed to framework located beneath the seat cushion to hold the sensor 736 in a fixed position and allow the sensor 736 to detect relative motion between the levers 724 with respect to the linkage 767.

Figure 16:
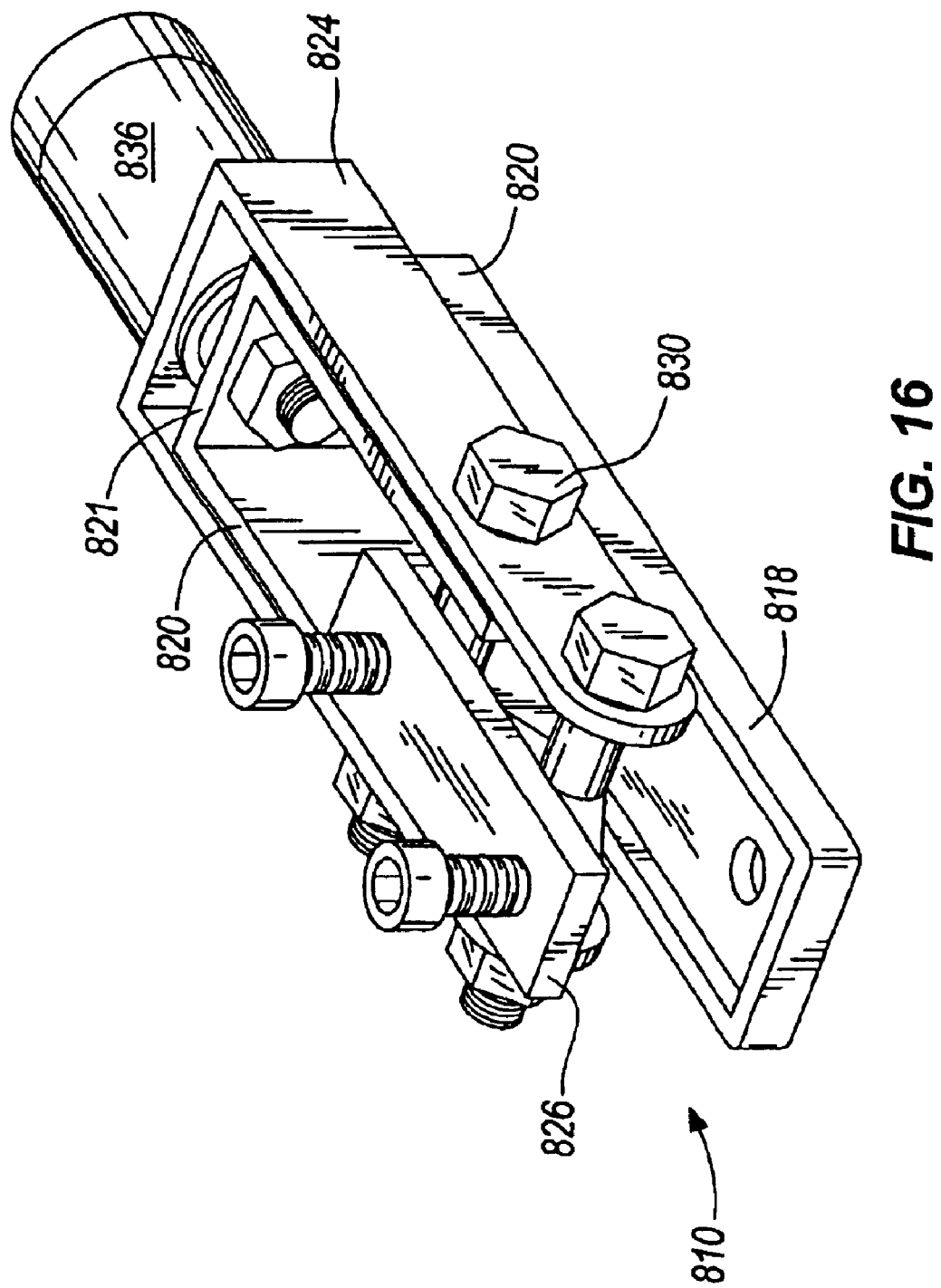
FIG. 16 is a perspective view of a ninth embodiment of the present invention.

FIG. 16 illustrates a ninth embodiment of the present invention. The ninth embodiment includes four brackets 810 placed under the seat (one adjacent each corner) and a sensor 836 that senses relative movement of the lever 824 with respect to the support 818 due to forces from the seat. The support 818 has a U-shaped wall defined in the illustration by two spaced apart, substantially parallel walls 820 connected at one end by a perpendicular wall 821. The U-shaped wall of the support 818 extends up from the floor to provide connection locations for the pivot 830 and sensor 836. The lever 824 is also U-shaped and extends around the outer periphery of the U-shaped support walls 820, 821. The pivot 830 extends through the substantially parallel side walls of the U-shaped structure in both the lever 824 and the support 818 to provide greater control of the lever 824 and limit the number of degrees of freedom for the lever 824. As illustrated, the sensor 836 extends through and is coupled to the end wall of both U-shaped structures. Finally, the seat connects to the free ends of the substantially parallel walls of the lever 824. Thus, vertically oriented forces from the seat cause the lever 824 to rotate about the pivot to transfer a force to the sensor 836.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, the embodiment illustrated in FIG. 16 can be modified in many ways and yet function in substantially the same way. One possible modification includes moving the sensor 836 to intersect at least one side wall of both the lever 824 and support 818 rather than the end walls. Additionally, the U-shaped support 818 does not need to have continuous walls that intersect. Rather, three tabs can project upwards to define connection locations for the pivot and the sensor.

Various other alternatives are also possible. For example, various alternatives to the certain features and elements of the present invention are described with reference to specific embodiments of the present invention. Furthermore, while described in connection with a vehicle seat and occupant weight, it would be readily understood by those of ordinary skill in the art that the teachings herein could be applied outside of vehicles to a variety of load-bearing platforms used to weigh a variety of loads, not just those created by occupants. With the exception of features, elements, and manners of operation that are mutually exclusive of or are inconsistent with each embodiment described above, it should be noted that the alternative features, elements, and manners of operation described with reference to one particular embodiment are applicable to the other embodiments.

We claim:

1. An occupant weight sensing apparatus configured to be coupled to a vehicular seat and adapted to isolate vertical forces from non-vertical forces, the apparatus comprising:

a base connectable with the vehicle and having at least one support extending therefrom;

a pivot extending from the at least one support of the base;

a sensor coupled to the at least one support of the base; and a lever positioned adjacent to the base and having a bifurcated portion and a second portion, the lever coupled to the pivot along the bifurcated portion, the lever connectable with the seat along the bifurcated portion and pivotable about the pivot in response to forces applied to the seat, the sensor limiting the relative movement of the lever with respect to the base and capable of detecting the relative movement of the lever with respect to the base to sense the weight of the occupant, the lever configured to resist bending about an axis parallel to the pivot.

2. The apparatus of claim 1, wherein the second portion of the lever has a width extending in substantially the same direction as the axis of the pivot and a height extending in an at least partially vertical orientation perpendicular to the width, the height being greater than the width to prevent the lever from bending.

3. The apparatus of claim 1, wherein the sensor comprises a hall effect sensor and a magnet, the magnetic field sensed by the hall effect sensor changing as the relative position of the lever with respect to the base changes.

4. The apparatus of claim 1, wherein the lever is coupled to the sensor along the second portion of the lever.

5. The apparatus of claim 1, wherein the pivot is a first pivot and the lever is a first lever, the apparatus further comprising:

a second pivot extending from the at least one support of the base, the second pivot connected to the at least one support at a location different than the first pivot; and a second lever positioned adjacent to the base and having a bifurcated portion and a second portion, the second lever coupled to the second pivot along the bifurcated portion, the second lever connectable with the seat along the bifurcated portion and pivotable about the second pivot in response to forces applied to the seat, the sensor limiting the relative movement of the second lever with respect to the base and capable of detecting the relative movement of the second lever with respect to the base to sense the weight of the occupant, the second lever configured to resist bending about an axis parallel to the pivot.

6. The apparatus of claim 5, wherein the second portion of the second lever and the second portion of the first lever overlap.

7. The apparatus of claim 6, wherein the sensor extends through the overlapping portions of each lever.

8. The apparatus of claim 5, wherein the forces transferred from the weight of the occupant to each lever is mechanically summed at the sensor.

9. The apparatus of claim 5, wherein the second portion of the second lever has a width extending in substantially the same direction as the axis of the second pivot and a height extending in an at least partially vertical orientation perpendicular to the width, the height being greater than the width to prevent the second lever from bending.

10. The apparatus of claim 5, wherein the second lever is coupled to the sensor along the second portion of the second lever.

11. The apparatus of claim 1, wherein the at least one support of the base is defined by a first wall and a second wall parallel to the first wall, the pivot extending between the first wall and the second wall.

12. The apparatus of claim 11, wherein the lever is positioned between the first wall and second wall of the at least one support.

13. The apparatus of claim 11, wherein the lever is positioned adjacent the first wall, wherein the first wall is located between the lever and the second wall.

14. The apparatus of claim 11, wherein the sensor is coupled to the first wall.

15. The apparatus of claim 11, wherein the at least one support of the base is defined by a first wall, a second wall parallel to the first wall, and a third wall normal to the first and second wall, the pivot extending between the first wall and the second wall.

16. The apparatus of claim 15, wherein a first branch of the bifurcated portion is separated from a second part of the bifurcated portion by the first and second walls.

17. The apparatus of claim 16, wherein the sensor is coupled to the third wall.

18. An apparatus to connect a seat to a floor of a vehicle, the seat having a front, a back, a first side, and a second side opposite the first side, the apparatus comprising:
a first lever positionable between the floor and seat and pivotable about a first axis substantially parallel to the floor and extendale through planes defined by the first and second sides of the seat, the first lever having
a first portion having a bifurcated end and positionable adjacent the first side of the seat, the first axis extending through the bifurcated end and the first portion pivotable about the first axis, the first portion configured to resist bending about a second axis parallel to the first axis;
a second portion having a bifurcated end and positionable adjacent the second side of the seat, the first axis extending through the bifurcated end and the second portion pivotable about the first axis, the second portion configured to resist bending about a third axis parallel to the first axis; and
a third portion connecting the first portion to the second portion, the third portion having a tab extending in a direction substantially perpendicular to the first axis;
a second lever positionable between the floor and seat and pivotable about a fourth axis substantially parallel to the floor and extendable through planes defined by the first and second sides of the seat, the second lever having
a first portion having a bifurcated end and positionable adjacent the first side of the seat, the fourth axis extending through the bifurcated end and the first portion pivotable about the fourth axis, the first portion configured to resist bending about a fifth axis parallel to the fourth axis;
a second portion having a bifurcated end and positionable adjacent the second side of the seat, the fourth axis extending through the bifurcated end and the second portion pivotable about the fourth axis, the second portion configured to resist bending about a sixth axis parallel to the fourth axis; and
a third portion connecting the first portion to the second portion, the third portion having a tab extending in a direction substantially perpendicular to the first axis; and
a sensor extending through the tab of each lever and connecting the first lever to the second lever, the sensor capable of detecting movement of the levers due to weight on the seat and positioned to limit the relative movement of the levers with respect to the base.

19. The apparatus of claim 18, further comprising a first and second pivot extending along the first axis and defining a pivot point of the first lever, the first pivot located on the first side of the seat and the second pivot located on the second side of the seat.

20. The apparatus of claim 19, further comprising a third and fourth pivot extending along the fourth axis and defining a pivot point of the second lever, the third pivot located on the first side of the seat and the fourth pivot located on the second side of the seat.

21. The apparatus of claim 18, wherein the first and second portion of each lever has a width extending in substantially the same direction as the first and fourth axis, respectively and a height extending in an at least partially vertical orientation perpendicular to the width, the height being greater than the width to prevent bending.

22. An apparatus to connect a seat to a floor of a vehicle, the apparatus comprising:
a first lever configured to be coupled to the floor and pivotable about a first axis that is substantially parallel to the floor, the first lever connectable with the seat at a first end of the lever and pivotable about the first axis in response to forces applied to the seat, the second end of the first lever having an aperture, the first lever configured to resist bending about a second axis substantially parallel to the first axis;
a second lever configured to be coupled to the floor and pivotable about a third axis that is substantially parallel to the floor and located a first distance from the first axis, the second lever connectable with the seat at a first end of the second lever and pivotable about the third axis in response to forces applied to the seat, the second end of the second lever having an aperture, the second lever configured to resist bending about a fourth axis substantially parallel to the third axis;

a sensor configured to be coupled to the floor and located a second distance from the first pivot, the second distance less than the first distance, the sensor extending through the aperture of the first lever and the aperture of the second lever, the sensor limiting the relative movement of the lever with respect to the base and capable of detecting the relative movement of the lever with respect to the base due to forces on the seat.

23. The apparatus of claim 22, wherein the first end of the first lever is bifurcated and the first end of the second lever is bifurcated.

24. The apparatus of claim 22, wherein:

the first lever has a width extending in substantially the same direction as the first axis and height extending in an at least partially vertical orientation perpendicular to the width, the height being greater than the width to prevent the first lever from bending; and the second lever has a width extending in substantially the same direction as the third axis and height extending in an at least partially vertical orientation perpendicular to the width, the height being greater than the width to prevent the second lever from bending.

25. The apparatus of claim 22, wherein the forces transferred to each lever from the forces applied to the seat are mechanically summed at the sensor.

26. A method of sensing and isolating a vertical load due to weight applied to a seat, the method comprising:

applying a load to the seat, the load having a vertical force component and a horizontal force component;

transferring the load from the seat to a structure supporting the seat, the structure having a base coupled to a floor, a first lever coupled to the base at a first pivot, and a second lever coupled to the base at a second pivot, a portion of the second lever overlapping and coupled to the first lever, and a sensor coupled to the first and second lever at the overlapping portion;

pivoting the first and second lever with respect to the base due to the vertical force component of the load transferred to the supporting structure;

isolating the horizontal force component at the first and second pivot;

preventing the horizontal force component from acting on the sensor by isolating it at the first and second pivot;

summing the vertical load applied to the first lever and the vertical load applied to the second lever at the sensor; and sensing the weight applied to the seat by measuring the summed vertical load.

27. An apparatus to connect a seat to a floor of a vehicle, the apparatus comprising:

a base connectable with the floor of the vehicle, the base having at least three connecting locations defined as a first, second, and third connection location;

a pivot extending from the first connecting location to the second connecting location;

a sensor coupled to the third connecting location; and a U-shaped lever extending at least partially around a perimeter of the base defined by the three connecting locations, the lever having a first and second portion defining the sides of the U-shaped lever and a third portion connecting the first and second portions, the pivot intersecting the first portion and the second portion to couple the lever to the base; the sensor coupled to the lever to restrict the relative movement of the lever with respect to the base and capable of detecting the relative movement of the lever with respect to the base to sense the weight of the occupant.

28. The apparatus of claim 27, wherein the lever is configured to resist bending about an axis parallel to the pivot.

29. The apparatus of claim 28, wherein:

the first portion of the lever has a width extending in substantially the same direction as the pivot and a height extending in an at least partially vertical orientation perpendicular to the width, the height being greater than the width to prevent the first lever from bending; and the second portion of the lever has a width extending in substantially the same direction as the pivot and a height extending in an at least partially vertical orientation perpendicular to the width, the height being greater than the width to prevent the second lever from bending.

30. The apparatus of claim 27, wherein the sensor is coupled to the lever along the third portion of the lever.

31. The apparatus of claim 27, the lever is connectable with the seat along the first and second portions and pivotable about the pivot in response to forces applied to the seat.

32. The apparatus of claim 27, wherein the at least one support has a first wall supporting the first connection location, a second wall parallel to the first wall and supporting the second connection location, and a third wall normal to the first and second wall.

33. The apparatus of claim 32, wherein the third wall supports the third connection location.

34. A weight sensing apparatus adapted to isolate vertical forces from non-vertical forces applied to a load-bearing platform, the apparatus comprising:

a base having at lease one support extending in a vertically oriented direction with respect to the floor of the vehicle;

a first pivot having a first axis extending perpendicularly from the at least one support of the base;

a lever positioned adjacent to the base and coupled to the first pivot, the lever pivotable about the first axis;

a linkage adapted to connect the load-bearing platform to the lever, the linkage coupled to the lever and pivotable about at least a second axis, the second axis being substantially perpendicular to the first axis; and a sensor coupled to the at least one support of the base and the lever.

35. The apparatus of claim 34, wherein the lever has a first end and second end, the lever configured to be coupled to the load-bearing platform at the first end and a sensor at the second end.

36. The apparatus of claim 35, wherein the first end of the lever is bifurcated.

37. The apparatus of claim 36, wherein the lever is configured to be coupled to the first pivot along the bifurcated portion.

38. The apparatus of claim 34, wherein the sensor extends between the support of the base and the lever, the sensor limiting the relative movement of the lever with respect to the base and capable of detecting the relative movement of the lever with respect to the base to sense the weight of a load.

39. The apparatus of claim 38, wherein the sensor comprises a hall effect sensor and a magnet, the magnetic field sensed by the hall effect sensor changing as the relative position of the lever with respect to the base changes.

40. The apparatus of claim 34, wherein the lever is configured to resist bending about an axis parallel to the first pivot.

41. The apparatus of claim 34, wherein the lever has a width extending in substantially the same direction as the first axis of the first pivot and a height extending in an at least partially vertical orientation perpendicular to the width, the height being greater than the width.

42. The apparatus of claim 34, wherein the lever is a first lever and the linkage is a second linkage, the apparatus further comprising:
   a second pivot having a third axis extending perpendicularly from the at least one support of the base;
   a second lever positioned adjacent to the base and coupled to the second pivot, the second lever pivotable about the third axis; and
   a second linkage adapted to connect the load-bearing platform to the second lever, the second linkage coupled to the second lever and pivotable about a fourth axis, the fourth axis being substantially perpendicular to the third axis.

43. The apparatus of claim 42, wherein the second portion of the second lever and the second portion of the first lever overlap.

44. The apparatus of claim 43, wherein the sensor extends through the overlapping portions of each lever.

45. The apparatus of claim 42, wherein the forces transferred from the weight of the load to each lever are mechanically summed at the sensor.

46. The apparatus of claim 42, wherein the second lever is configured to resist bending about an axis parallel to the second pivot.

47. The apparatus of claim 42, wherein the second portion of the second lever has a width extending in substantially the same direction as the axis of the second pivot and a height extending in an at least partially vertical orientation perpendicular to the width, the height being greater than the width.

48. The apparatus of claim 42, wherein the second lever has a first end and second end, the second lever coupled to the seat at the first end and sensor at the second end.

49. The apparatus of claim 48, wherein the first end of the second lever is bifurcated.

50. The apparatus of claim 49, wherein the second lever is coupled to the second pivot along the bifurcated portion.

51. The apparatus of claim 34, wherein the at least one support of the base is defined by a first wall and a second wall parallel to the first wall, the pivot extending between the first wall and the second wall.

52. The apparatus of claim 51, wherein the lever is positioned between the first wall and second wall of the at least one support.

53. The apparatus of claim 51, wherein the lever is positioned adjacent the first wall, wherein the first wall is located between the lever and the second wall.

54. The apparatus of claim 51, wherein the sensor is coupled to the first wall.

55. The apparatus of claim 34, wherein the at least one support of the base is defined by a first wall, a second wall parallel to the first wall, and a third wall normal to the first and second wall, the pivot extending between the first wall and the second wall.

56. The apparatus of claim 55, wherein a first branch of the bifurcated portion is separated from a second part of the bifurcated portion by the first and second walls.

57. The apparatus of claim 56, wherein the sensor is coupled to the third wall.

58. The apparatus of claim 34, wherein the linkage is connected to the lever via a ball joint.

59. The apparatus of claim 58, wherein the lever has top surface and the linkage is connected to the lever via a ball joint along the top surface of the lever.

* * * * *